(12) United States Patent
Moller et al.

(10) Patent No.: US 7,562,621 B2
(45) Date of Patent: Jul. 21, 2009

(54) BIDIRECTIONAL LENS PRESSING SYSTEM

(75) Inventors: John Moller, Castro Valley, CA (US);
Heide E. Moller, legal representative, Castro Valley, CA (US); Ting Shi, San Jose, CA (US); Zhiqiang Zheng, Sunnyvale, CA (US); Pavel Ploscariu, San Ramon, CA (US)

(73) Assignee: Finisar Corporation, Sunnyvale, CA (US)

(*) Notice: Subject to any disclaimer, the term of this patent is extended or adjusted under 35 U.S.C. 154(b) by 109 days.

(21) Appl. No.: 11/677,028

(22) Filed: Feb. 20, 2007

(65) Prior Publication Data
US 2007/0272093 A1 Nov. 29, 2007

Related U.S. Application Data

(60) Provisional application No. 60/775,144, filed on Feb. 20, 2006.

(51) Int. Cl.
*B30B 1/18* (2006.01)
*B23P 21/00* (2006.01)

(52) U.S. Cl. .............. 100/289; 100/226; 100/231; 100/264; 100/353; 29/281.3; 29/257; 29/793

(58) Field of Classification Search .......... 100/214, 100/226, 230, 231, 264, 289, 353; 269/289 R; 29/428, 525, 700, 720, 721, 799, 559, 792, 29/793, 281.1, 281.3, 256, 257, 783, 786
See application file for complete search history.

(56) References Cited

U.S. PATENT DOCUMENTS

| 1,456,673 | A | * | 5/1923 | Dey | 451/460 |
| 2,337,366 | A | * | 12/1943 | Beck | 29/243.56 |
| 6,615,711 | B2 | * | 9/2003 | Matsuzuki et al. | 100/218 |
| 7,103,953 | B2 | * | 9/2006 | Wisecarver et al. | 29/407.01 |
| 7,322,082 | B2 | * | 1/2008 | Natsume et al. | 29/260 |

* cited by examiner

*Primary Examiner*—Jimmy T Nguyen
(74) *Attorney, Agent, or Firm*—Workman Nydegger

(57) ABSTRACT

A bidirectional lens pressing system for use in pressing a lens into a port housing is disclosed. The lens pressing system includes a frame that supports a top motor stage, a bottom motor stage, and an indexing stage. The indexing stage is interposed between the top and bottom motor stages and includes a hole that retains a port housing or other component. The top pressing tool is selectively movable in a first direction by the top motor stage and includes a first engagement surface for engaging the lens. Correspondingly, the bottom pressing tool is selectively movable in a an opposing second direction by the bottom motor stage and includes a second engagement surface for engaging the port housing. The first and second engagement surfaces of the top and bottom pressing tools cooperate to press the lens into the port housing while imposing no net force on the indexing stage.

18 Claims, 9 Drawing Sheets ial Patent Application No. 60/775,144, filed Feb. 20, 2006, and
BIDIRECTIONAL LENS PRESSING SYSTEM

CROSS-REFERENCE TO RELATED APPLICATIONS

This application claims the benefit of the U.S. Provisent
entitled "Bidirectional Lens Pressing System," which is incorporated herein by reference in its entirety.

BACKGROUND

1. Technology Field

The present invention generally relates to the manufacture of optical devices. In particular, the present invention relates to an apparatus that enables the bidirectional pressing of a component, such as a lens, into a holder in such a manner as to prevent damage to the component or the holder.

2. The Related Technology

Optical transceiver modules and other optically-based devices used in optical communications systems employ one or more components having lenses. Such lenses must be properly and accurately placed within the component in order to properly focus or otherwise condition an optical signal passing therethrough. Lens presses are typically used during manufacture to press a lens into place within the component in which the lens is to be housed. An example of a component utilizing a lens pressed into place is a transmitter optical subassembly, which is used within an optical transceiver module to produce and prepare optical signals for transmission via an optical fiber.

Known lens pressing apparatus, however, are often manually operated. The result with such manual processes is often an imprecise placement of the lens within the lens holder. In addition, manual presses are slow in terms of component throughput and lack of process control.

Automatic lens presses have also been employed to speed throughput, but nonetheless tend to produce at a relatively low level of productivity, due to poor lens position control accuracy. Also, such presses use a force from only one direction when inserting the lens within the lens holder. Often, this method can damage the lens, lens holder, or the stage that retains the parts before pressing by producing unbalanced forces on one or more of these elements.

In light of the above considerations, a need exists in the art for a means by which lenses can be acceptably pressed into position within an optical component. Any solution to this need should operate at a rate that ensures acceptable part throughput rates so as to reduce production times. Further, the less pressing should be accomplished such that damage to the lens or its holder or component is prevented.

BRIEF SUMMARY

The present invention has been developed in response to the above and other needs in the art. Briefly summarized, embodiments of the present invention are directed to a bidirectional lens pressing system for use in pressing a lens into a port housing. The lens pressing system includes a frame that supports a top motor stage, a bottom motor stage, and an indexing stage. The indexing stage is interposed between the top and bottom motor stages and includes a hole that retains a port housing or other component. The top pressing tool is selectively movable in a first direction by the top motor stage and includes a first engagement surface for engaging the lens. Correspondingly, the bottom pressing tool is selectively movable in a an opposing second direction by the bottom motor stage and includes a second engagement surface for engaging the port housing. The first and second engagement surfaces of the top and bottom pressing tools cooperate to press the lens into the port housing while imposing no net force on the indexing stage.

A separator housing is included with the top pressing tool to prevent sticking of the port housing to the top pressing tool after the lens pressing process is complete. Further, the lens pressing system can be configured for automatic operation, increasing throughput and precision.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-6 depict various features of embodiments of the present invention, which is generally directed to an automatically driven pressing system for pressing one component, such as a lens, into another component configured to hold the first component, such as a lens holder employed in optical subassemblies. In addition to being automatically driven, the pressing system described herein is configured to press two components together using opposing pressing forces. This bidirectional pressing motion allows the components to be joined while canceling out net stress applied to an indexer stage that holds one or both components before pressing. Force feedback functionality can be included with the pressing system so as to ensure that the components are precisely joined together with a proper amount of force. Moreover, use of the pressing system as disclosed herein can result in a four-fold increase over other known pressing systems and methods.

Figure 1:
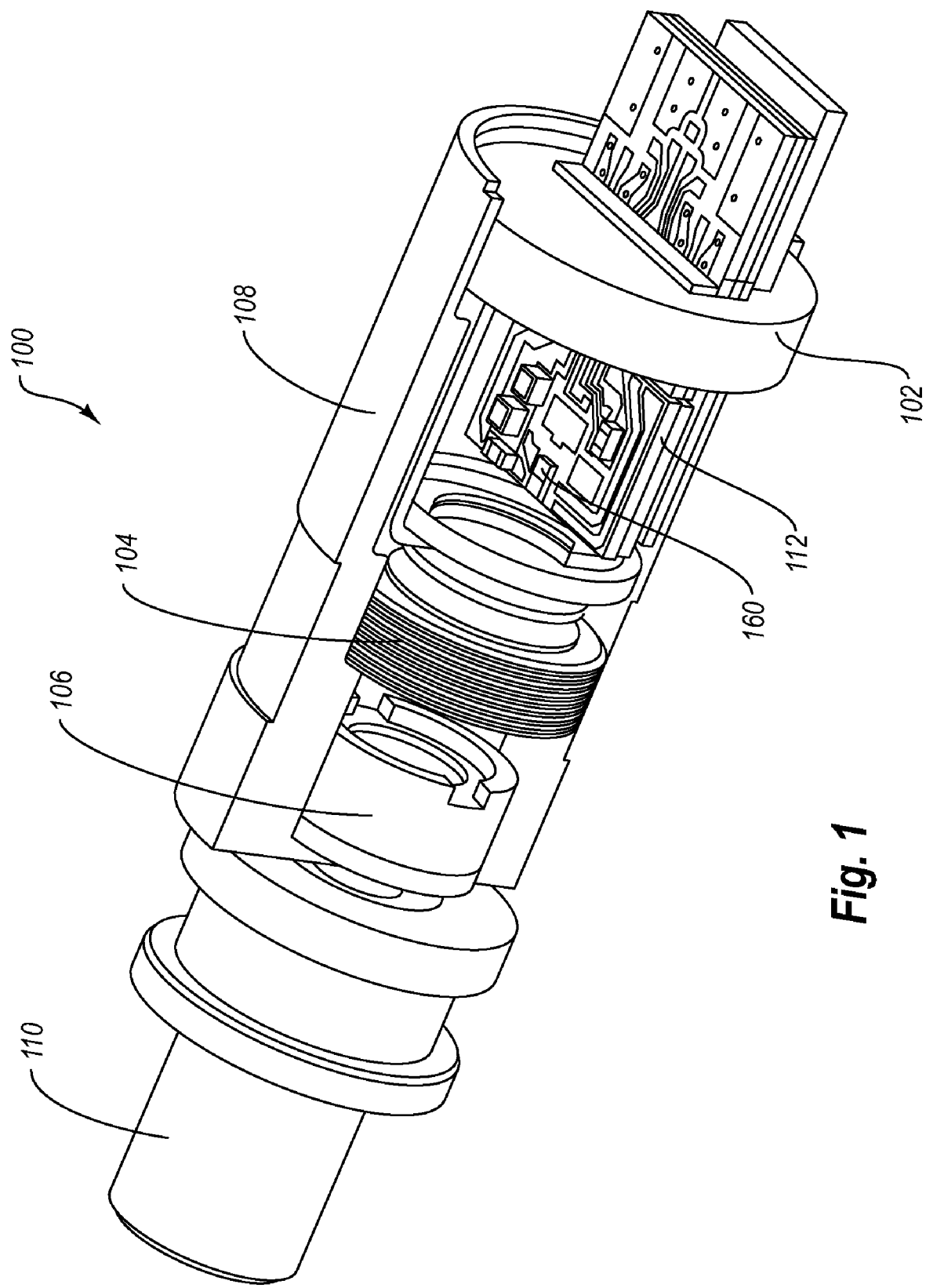
FIG. 1 is a perspective cutaway view of a transmitter optical subassembly having a lens assembly that can be manufactured using the lens pressing system of embodiments of the present invention.

Reference is first made to FIG. 1, which depicts various details of a transmitter optical subassembly ("TOSA"), generally depicted at 100, for use in producing data-containing optical signals for transmission via a communications network. In one embodiment, the TOSA 100 is included in an optical transceiver module (not shown).

The TOSA 100 includes various components that operate together in producing and emitting a data-containing optical signal, including a TO header 102, a lens mount 104, and an isolator 106. These components are contained within a port housing 108, which in turn is operably connected to a receptacle 110.

In greater detail, the TO header 102 includes a submount 112 that has mounted thereon a laser diode, such as an externally modulated laser ("EML") 160, that produces an optical signal on which data can be encoded. The lens mount 104 includes a lens (not shown here) that focuses the optical signal emitted by the EML 160 during TOSA operation. The isolator 106 prevents back reflection of the optical signal from returning to the EML 160. The receptacle 110 is sized and configured so as to optically couple with a connectorized optical fiber (not shown) on which the optical signal produced by the EML 160 can be transmitted.

The lens mount 104 shown in FIG. 1 in one embodiment is press fit into the port housing 108 and maintained in position via an interference fit between its outer surface and the port housing inner surface and by engagement of the lens holder body with a ridge defined by the port housing inner surface. In another embodiment, the lens mount is integrally formed with the port housing.

Similar to the former interference fit configuration described above, the lens housed within the lens mount 104 is press fit into the lens mount in the present embodiment. As proper insertion and positioning of the lens within the lens mount 104 is crucial to the success of the TOSA in satisfactorily transmitting the optical signals produced by the EML 160, any device used for the lens pressing procedure should be capable of performing this task in accordance with the accuracy and precision required. Embodiments of the present pressing system meet these requirements, as will be seen.

It is noted here that, while the discussion to follow will focus on the pressing of lenses into lens holders, embodiments of the present pressing system can be extended to use in pressing other component configurations as well. For instance, selected components can be inserted into a TOSA nosepiece. Further, embodiments of the present invention can be used to press a variety of lens types into different holder types, or to press lenses in components that are not related to the transmission of data-containing optical signals for use in a communications network.

Figure 2A:
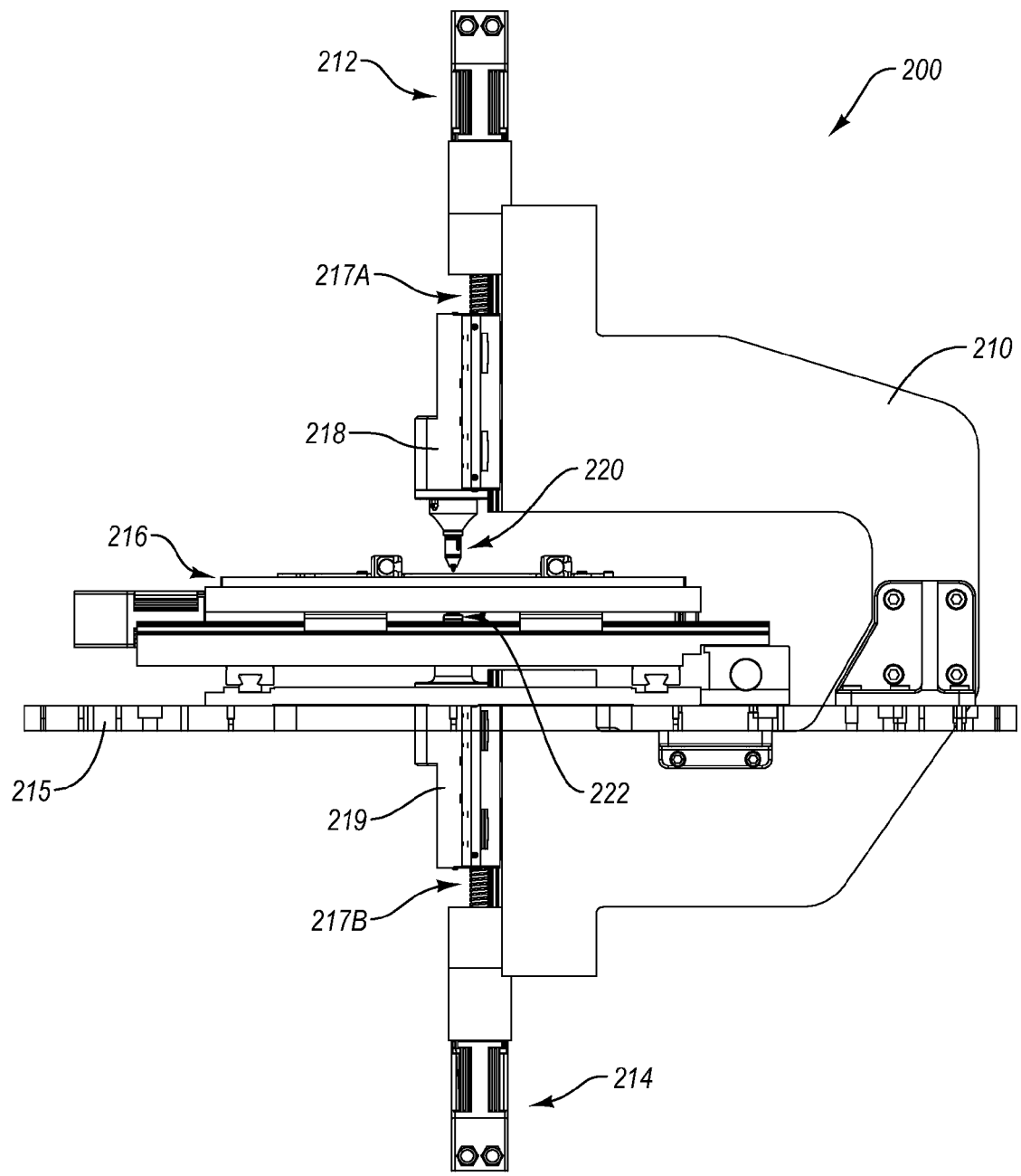
FIG. 2A is a side view of a lens pressing system according to one embodiment.

Reference is now made to FIG. 2A, in which one embodiment of the present invention is depicted. In detail, FIG. 2A shows a lens pressing system, generally designated at 200, and its various constituent elements, including a support frame 210, a top motor stage 212, a bottom motor stage 214, and an XY indexer stage 216 positioned on a stage support frame 215. These components cooperate in accurately and precisely inserting a lens within a lens holder, as will be described.

In greater detail, both the top motor stage 212 and bottom motor stage 214 are operably attached to the support frame 210 so as to selectively move a top tool support 218 and bottom tool support 219 vertically with respect to the XY indexer stage 216. To enable such movement, the top and bottom motor stages 212 and 214 each include ball screw assemblies 217A and 217B, respectively, that offer sub-micrometer scale vertical movement of the top and bottom tool supports 218, 219 with respect to the XY indexer stage 216. Of course, other gear and vertical movement mechanisms can be alternatively employed. The top and bottom motor stages 212 and 214 are capable of pressing loads exceeding 1,000 pounds, in one embodiment.

The top tool support 218 further includes a top pressing tool 220 that is configured to press a lens into a cavity defined in a lens holder (FIG. 4A) or other suitable component. Correspondingly, the bottom tool support 219 includes a bottom pressing tool 222 that is configured to support the lens holder for receiving the lens during the pressing process. As will be seen below, the top and bottom pressing tools 220 and 222 are configured to perform this pressing task with precision such that the lens is neither loosely positioned nor excessively inserted such that lens cracking or lens holder damage occurs.

As best seen in FIG. 2A, the top and bottom pressing tools 220 and 222 are vertically aligned with one another so as to ensure that misalignment of the parts to be pressed is avoided. Also, and as previously mentioned, both the top and bottom pressing tools 220 and 222 provide opposing press forces with respect to one another during the pressing process in order to precisely mate the parts together without creating undue stress on the XY indexer stage 216. In one embodiment, the opposing forces produced by the pressing tools 220 and 222 by each pressing tool being moved simultaneously, while in another embodiment, only one or the other pressing tool is moved.

Figure 2B:
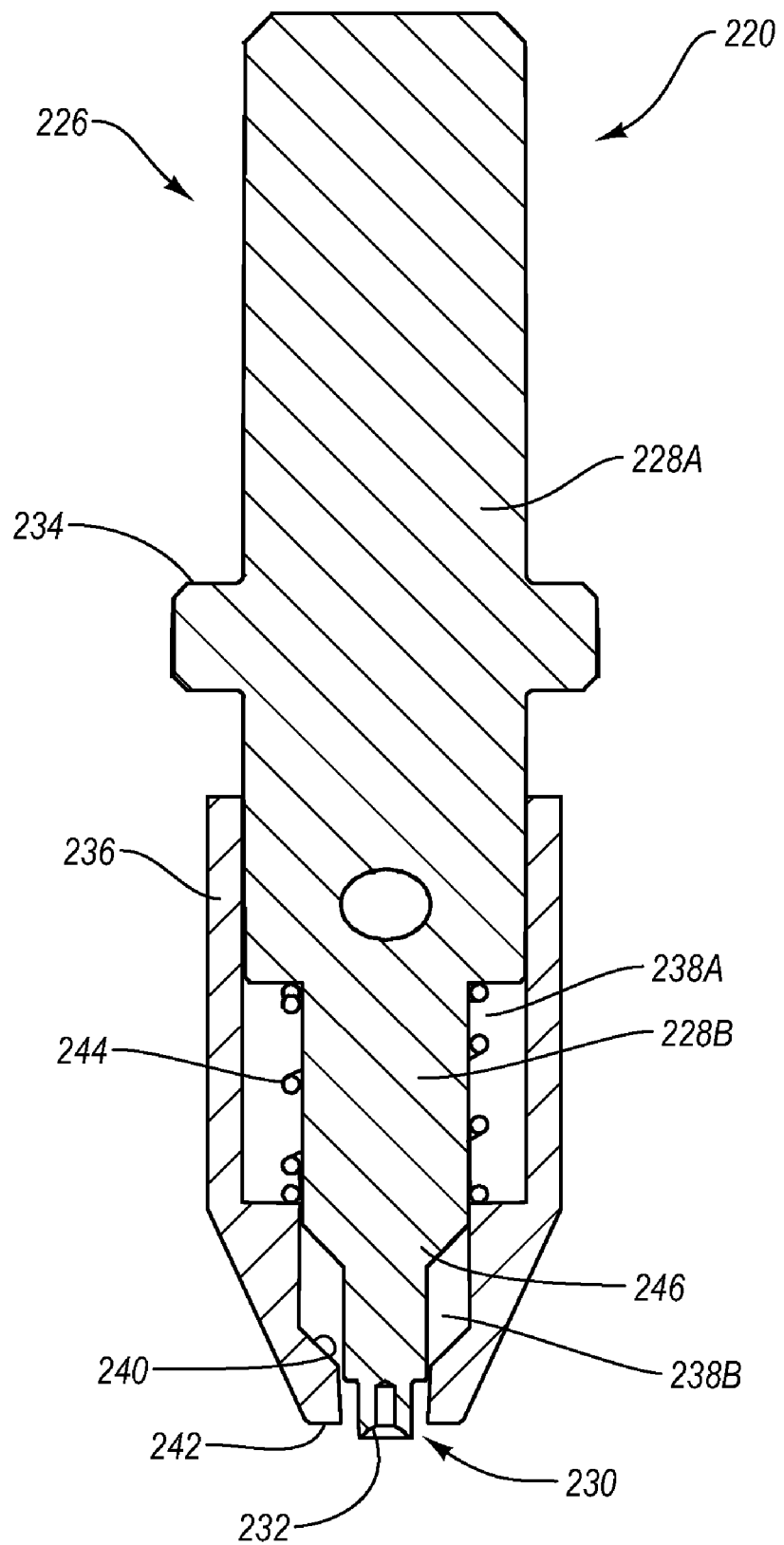
FIG. 2B is a cross sectional side view of a top pressing tool of the lens pressing system shown in FIG. 2A.

Reference is now made to FIG. 2B in describing various details regarding the top pressing tool 220. As shown, the top pressing tool 220 includes a post 226 having a first portion 228A and second portion 228B. A lens presser 230 is included at a distal end of the second post portion 228B and includes an engagement surface 232 for engaging a lens during a pressing process, as will be described. The engagement surface 232 in the present embodiment defines an inwardly slanted annular surface that is configured to evenly apply pressure to a ball lens during the pressing process. Of course, the engagement surface of the top pressing tool can be configured in other shapes or configurations as needed for a particular pressing application or lens shape.

A flange 234 is included on the first post portion 228A. A separator housing 236 is disposed distally from the flange 234 coaxially about a distal portion of the first post portion 228A and is slidingly engaged therewith. The separator housing 236 defines a first cavity portion 238A and a second cavity portion 238B that together substantially enclose the second post portion 228B when the second post portion is in a retracted position, as is shown in FIG. 2B. The second cavity portion 238B defines a cavity taper 240 proximate a tip 242 located at a distal end of the separator housing 236. The cavity taper 240 is configured to be a stop point for a post taper 246 defined on the second post portion 228B so as to prevent further extension of the post 226 and connected lens presser 230 past a predetermined point during the pressing process, to be described below.

The tip 242 of the separator housing 236 defines a flat annular shape and is configured to assist in preventing inadvertent binding of the port housing with the top pressing tool during the pressing process, as explained below. A spring 244 is disposed in the first cavity portion 238A about a portion of the second post portion 228B and provides a separating force between the post 226 and the separator housing 236, which are independently movable with respect to one another, so as to maintain the lens presser 230 in a substantially retracted position within the second cavity portion 238B when not in use.

Figure 4A:
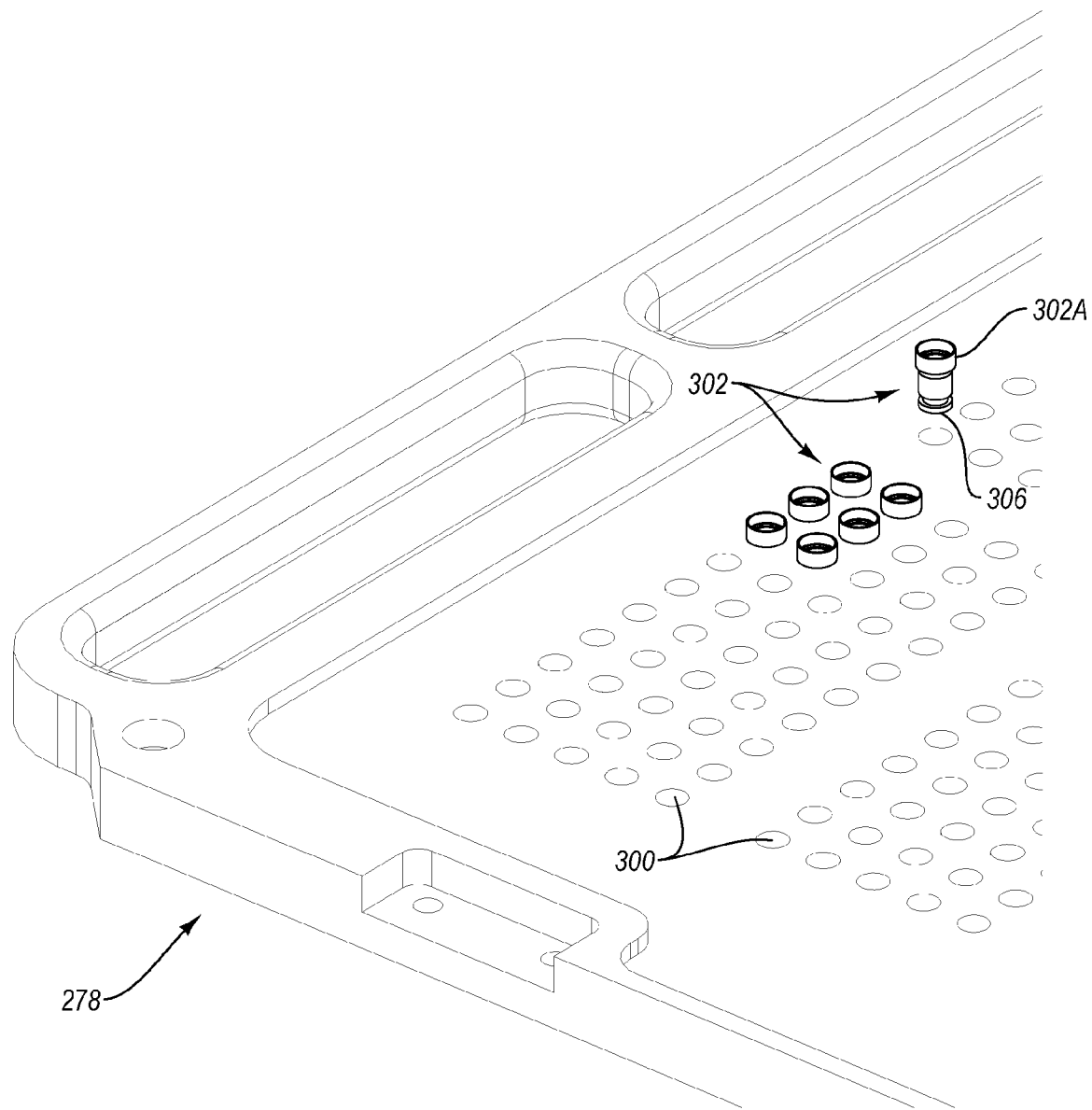
FIGS. 4A-4C show various views of the XY indexer stage of FIG. 3 and the pressing tools of the lens pressing system of FIG. 2A and their use in use in pressing a lens into a port housing, according to one embodiment.
Figure 4B:
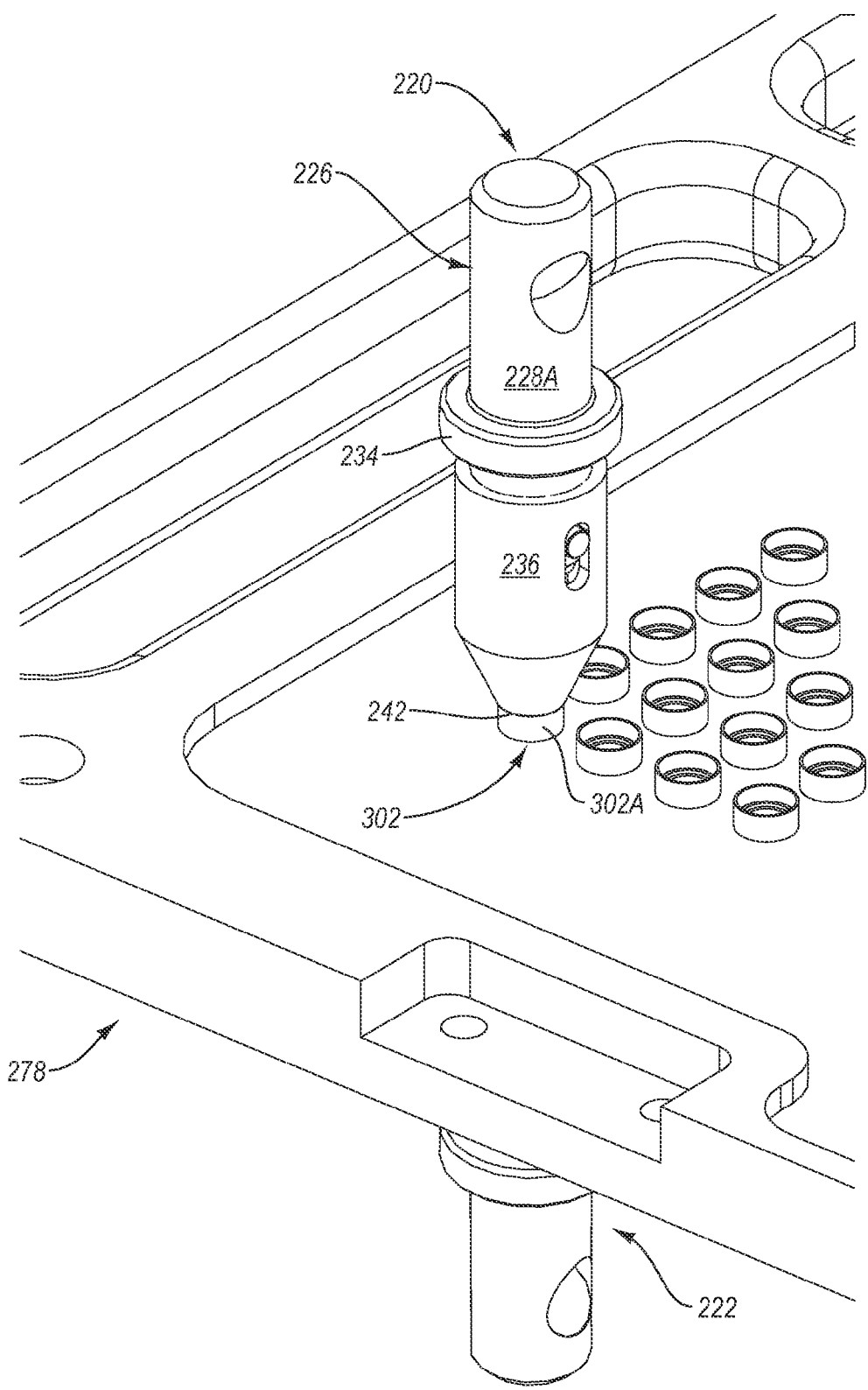
Figure 4C:
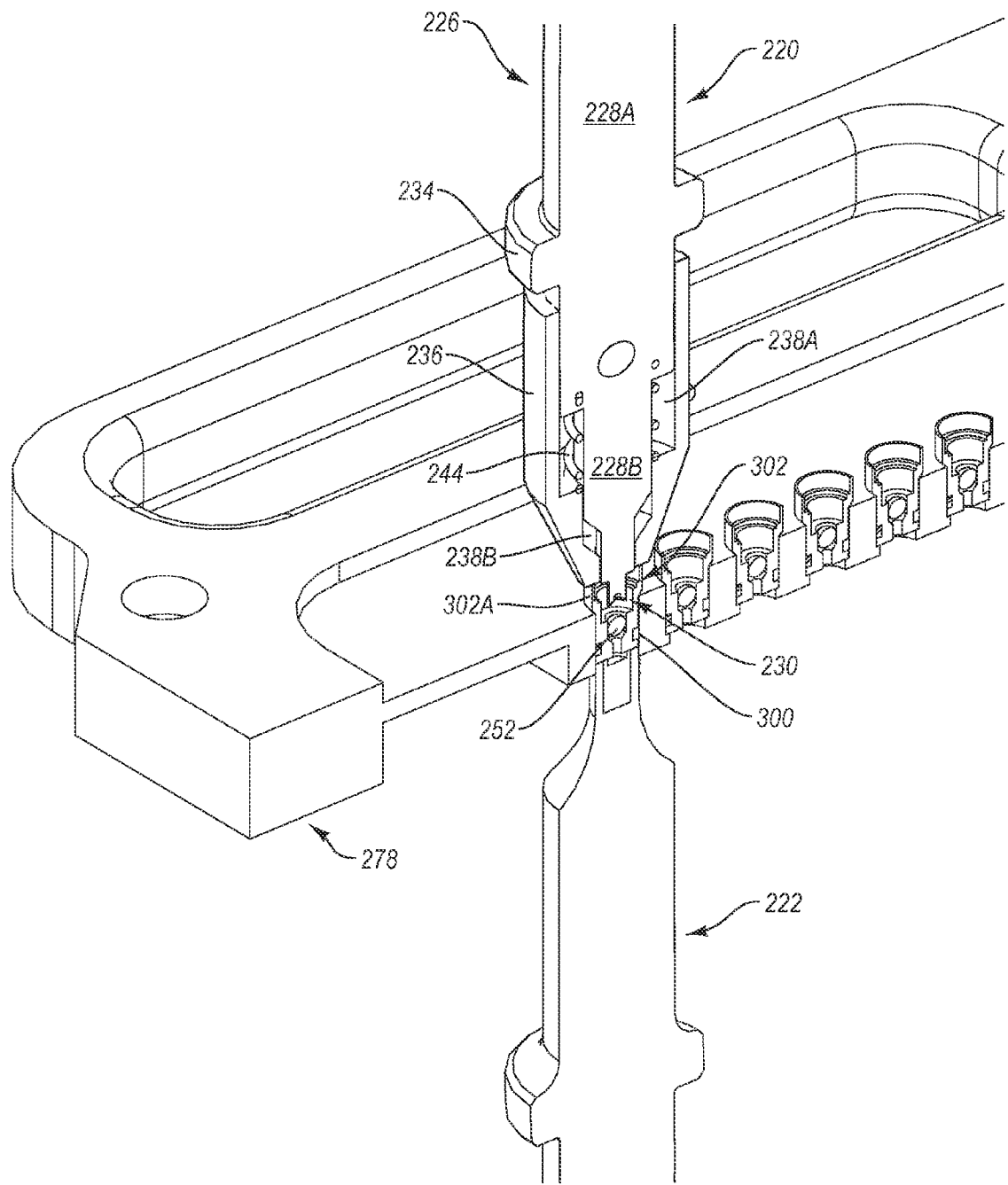
Figure 4D:
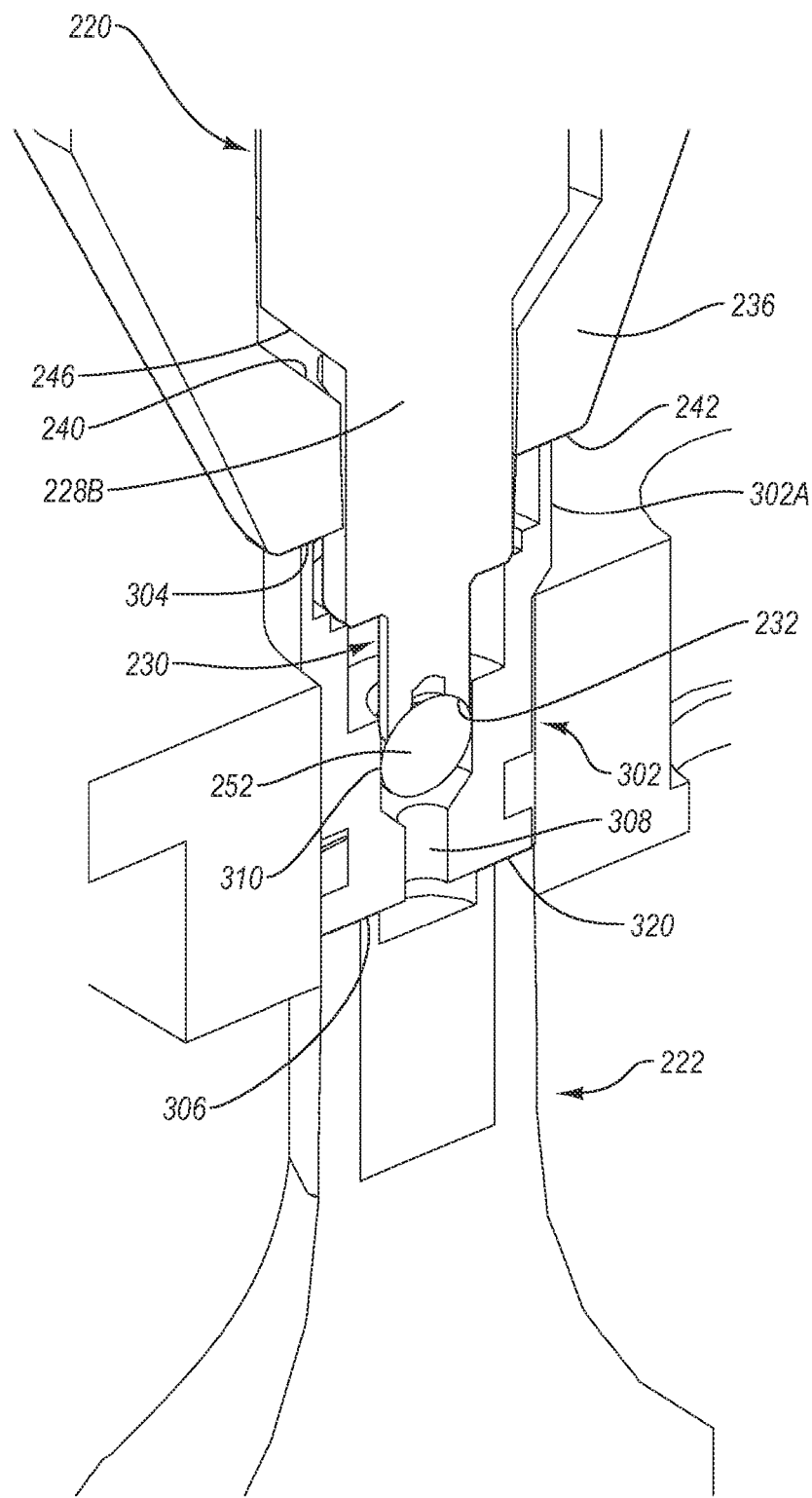
FIG. 4D is a cross sectional side view of a portion of the top and bottom pressing tools shown in FIG. 4C.

Reference is made to FIG. 4D in describing various aspects of the bottom pressing tool 222. In particular, the bottom pressing tool 222 includes a flat, annular engagement surface 320 that is configured to support the port housing 302 during the pressing process. As was the case with the engagement surface 232 of the top pressing tool 220, the engagement surface 320 can be adapted in form and configuration in order to acceptably support a port housing or other component having a different configuration.

Figure 3:
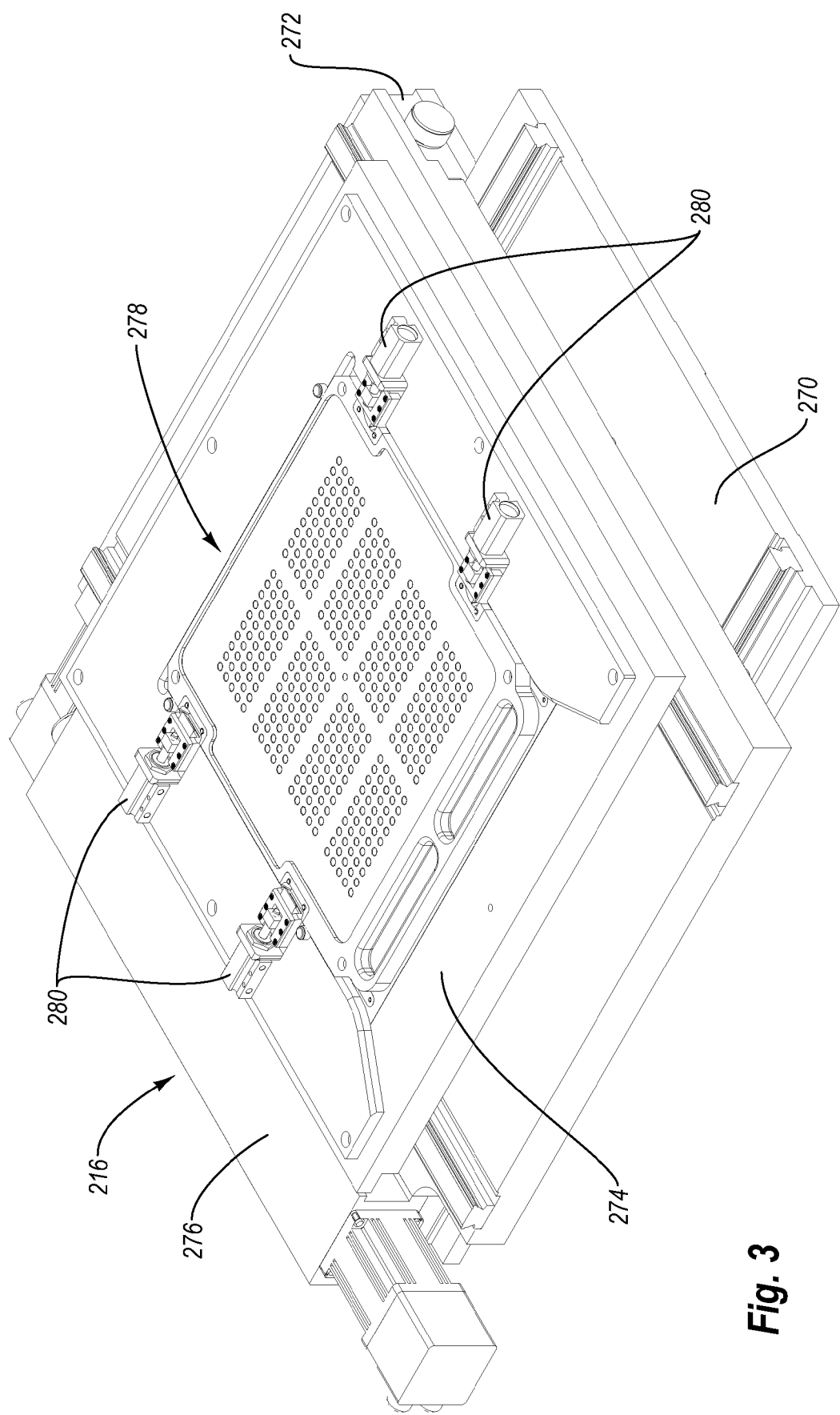
FIG. 3 is a perspective view of the XY indexer stage of the lens pressing system shown in FIG. 2.

Together with FIG. 2, reference is now made to FIG. 3 in describing various details regarding the XY indexer stage ("indexer") 216. As shown, the indexer 216 includes a first translation platform 270 having a platform drive 272 for selectively moving the first translation platform along a first axis, and a second translation platform 274 having a platform drive 276 for moving the second translation platform along a second axis orthogonal to the first axis.

A fixture 278 is included on the second translation platform 274 and secured thereto by a plurality of fasteners 280. So configured, the first and second translation platforms 270, 274 enable the fixture 278 to be translated as desired within an x-y plane.

Reference is now made to FIG. 4A in describing further aspects of the fixture 278. In particular, the fixture 278 includes a plurality of holes 300 defined through the fixture and configured each to receive a port housing 302 of an optical subassembly. The port housing 302 is similar to the port housing 108 of the TOSA 100 shown in FIG. 1. Each hole 300 is configured such that access to the port housing 302 is afforded both the top and bottom pressing tools 220 and 222 when the respective hole is positioned in vertical alignment with the pressing tools. To enable this alignment, the indexer 216 is horizontally movable in the x-y plane such that any hole 300 on the fixture 278 can be centered with respect to the top and bottom pressing tools 220 and 222. In one embodiment, the indexer 216 is sized such that as many as 400 holes 300 are defined in the fixture 278. This in turn allows for a large number of port housings 302 to be mated to lenses in an automatic and efficient manner during operation of the pressing system 200. The lenses to be mated with the port housings can also be stored on a specified location on the indexer 216 in one embodiment, if desired.

As shown in FIG. 4A, the port housing 302 includes a first portion 302A that extends from the respective hole when the port housing is received therein. A second end 306 of the port housing 302 is also shown here.

Together with FIG. 4A, reference is now made to FIGS. 4B-4D in describing various details regarding use of the lens pressing system in pressing a lens into a port housing. FIG. 4D shows further details of the port housing. As described, the port housing 302 includes a first portion 302A having an open first end 304, and an open second end 306 received into the respective hole 300. A port cavity 308 is defined between the ends 304 and 306. A lens mount 310 is included with the port housing 302 and defines a portion of the port cavity 308. In the illustrated embodiment, the lens mount 310 is integrally formed with the port housing 302, however, in other embodiments it can be separately made then joined.

FIG. 4B shows the top and bottom pressing tools 220 and 222 cooperating to press a lens into a suitable position within a lens mount of a selected one of the plurality of port housings 302. FIG. 4B further shows the manner of engagement between the tip 242 of the separator housing 236 and the first portion 302A of the port housing 302 during the lens pressing process. This engagement ensures that the port housing 302 does not stick to the engagement surface 232 of the top pressing tool 220 once the lens pressing process s complete. Rather, the separator housing 236 provides a downward force to the port housing 302 as the top pressing tool 220 is retracted from the hole 300, thereby urging the port housing to separate from the engagement surface 232 and remain in the hole.

FIGS. 4C and 4D show the manner in which a ball lens 252 is pressed into place within the lens mount 310 of the respective port housing 302. In particular, these figures show the lens presser 230 of the second post portion 228B of the top pressing tool 220 extending into the first end 304 of the port housing 302 such that the engagement surface 232 engages a corresponding surface of the ball lens 252. The engagement surface 320 of the bottom pressing tool 222 simultaneously engages the second end 306 of the port housing 302. Relative opposing movement between the engagement surfaces 232 and 320 causes pressing of the lens 252 down the port cavity 308 and into desired placement in the lens mount 310. The lens mount 310 is appropriately sized so as to cause an interference fit between its inner surface of the ball lens 252 to secure the lens in place. Again, the engagement surface and lens presser can be modified to press other lens types including aspherical lenses, etc. Also, the lens presser and bottom pressing tool can be modified to hold other types of components as may be desired in other applications.

FIG. 4C shows further detail regarding the separator housing 236, wherein engagement of the lens presser 230 of the top pressing tool 220 with the lens 252, together with engagement of the separator tip 242 with the first end 304 of the port housing, causes compression of the spring 244 and the resultant downward force on the port housing 302 in order to ensure separation of the port housing and top pressing tool once pressing of the lens is complete.

In one embodiment, use of the lens pressing system 200 in a pressing operation to insertably mate the ball lens 252 within the lens mount 310 of the port housing 302 proceeds as follows: a specified hole 300 of the indexer fixture 278 is aligned with the top and bottom pressing tools 220 and 222 by horizontally moving the indexer stage 216 as needed. This alignment can be performed automatically using a computer or other suitable device, if desired. As already discussed, the aligned hole 300 has residing therein the port housing 302. Also, the lens 252 is pre-loaded into the port housing 302 such that it resides atop the lens mount 310 in the port cavity 308 of the port housing. It is noted that in another embodiment the lens can be secured to the engagement surface of the top pressing tool lens presser before the pressing process is begun.

Once the indexer stage fixture hole 300 has been aligned with the top and bottom pressing tools 220 and 222, and the lens 252 has been loaded into the port housing 302, the bottom pressing tool can be vertically raised until the engagement surface 320 engages the port housing second end 306 and supports the port housing in place within the hole 300. In another embodiment, the bottom pressing tool can lift the port housing a small amount within the hole.

At or near the same time, the top pressing tool 220 is lowered toward the port housing 302 such that the engagement surface 232 of the lens presser 230 contacts the ball lens 252 in the port housing cavity 308. At some point during descent of the lens presser 230, the separator tip 242 contacts the first end 304 of the port housing 302. While the lens presser 230 continues to descend into the port cavity 308, the separator tip 242 does not, but rather remains engaged with the port housing first end 304.

Lowering of the lens presser 230 of the top pressing tool 220 occurs simultaneously with the raising or maintaining-in-place of the bottom pressing tool 222. This relative opposing motion results in passage of the lens 252 through the port housing cavity 308 and into the lens mount 310. The opposing, bidirectional pressing of the lens presser 230 and the bottom pressing tool 222 enables the lens 252 to be pressed into its proper position within the lens mount 310 and to be maintained in that position by virtue of an interference fit therebetween. It is therefore seen that the lens is pressed into place within the lens mount by virtue of bidirectional opposing movement of both the top pressing tool 220 and bottom pressing tool 222. This is in contrast to other known systems, where movement of a pressing tool against the indexer stage is used to press parts together. Such a system causes a relatively large amount of stress against the indexer stage, which can lead to premature stage failure. The present system, in contrast, substantially eliminates stress on the indexer stage, as the top and bottom pressing tools press against one another during the pressing process. This in turn preserves the integrity of the indexer stage.

Once the ball lens 252 has been properly pressed into position within the lens mount 310, the top and bottom pressing tools 220 and 222 are retracted up and down, respectively. Typically, this causes the lens-equipped port housing 302 to re-seat within its respective hole 300 in the fixture 278 of the indexer 216. On occasion, however, the port housing 302 will tend to stick to the top pressing tool 220 instead of remaining in the hole 300. The separator housing 236 is configured to prevent sticking of the port housing 302 to the top pressing tool 220 by providing a downward return force to the port housing that causes it to separate from the top pressing tool and return to its respective hole 300 in the indexer fixture 278. As mentioned, the separator housing 236 is spring loaded and independently movable with respect to the lens presser 230 and post 226 of the top pressing tool 220 so as to enable exertion of the return force. As such, the return force is insufficient to separate the port housing 302 from the top pressing tool lens presser 230 during mutual engagement of the top and bottom pressing tools 220 and 222 with the ball lens 252 and port housing during pressing. When the force provided to the port housing 302 by the component holder 260 of the bottom pressing tool 222 is removed after pressing is complete, however, the return force exerted by the separator housing 236 via the separator tip 242 is sufficient to separate the port housing from the lens presser 230, thereby allowing the port housing to re-seat in the respective hole 300. In addition to the separator described herein, other return force mechanisms can be alternatively employed in the lens pressing system.

Figure 5:
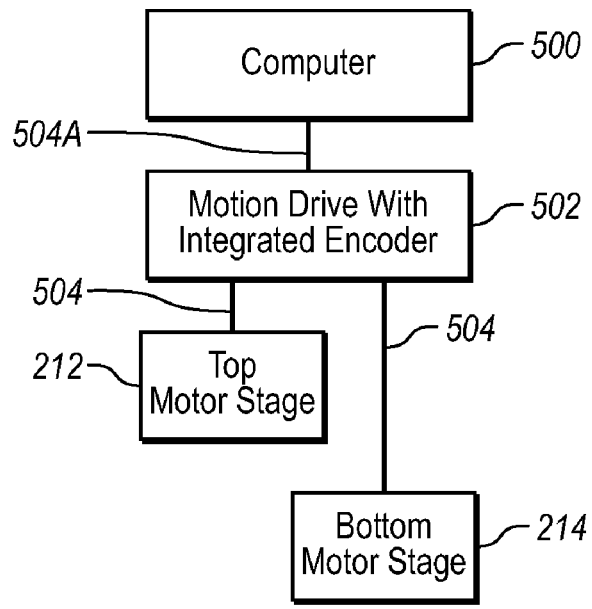
FIG. 5 is a simplified block diagram illustrating various components of a position encoder system used with the lens pressing system of FIG. 2A, according to one embodiment.

In the present embodiment, a position encoder, such as that shown in FIG. 5, is operably connected to the top and bottom pressing tools 220 and 222 to enable the positions of the pressing tools to be precisely known during the pressing process. As shown, in one embodiment the position encoder system includes a controller, such as a computer 500, and a motion drive/encoder 502 in communication with the top motor stage 212 and bottom motor stage 214 via connection lines 504. In the present embodiment, a firewire or other suitable cable is employed as a connection line 504A between the computer 500 and the motion drive/encoder 502.

Figure 6:
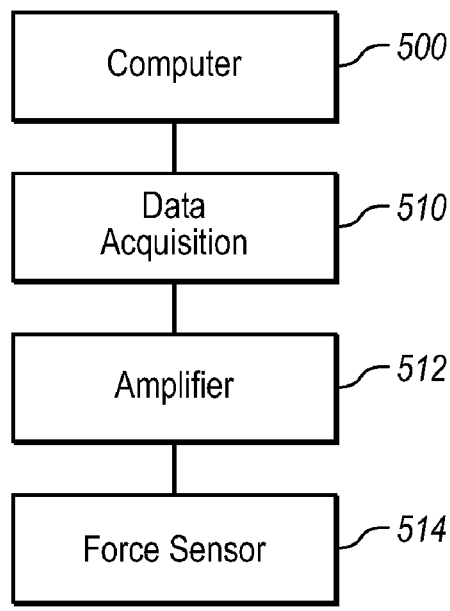
FIG. 6 is a simplified block diagram illustrating various components of a force feedback system used with the lens pressing system of FIG. 2A, according to one embodiment.

A force feedback detection system, such as that shown in FIG. 6, is also included in the present embodiment, such that the amount of force being applied during the pressing process can be continuously monitored. In the present embodiment, the force feedback system includes the computer 500, a data acquisition module 510, an amplifier 512, and a force sensor 514, though in another embodiment alternative or additional force feedback components can be included.

In the present embodiment, the force feedback system is operably integrated with the bottom motor stage 214 so as to monitor the amount of force being applied between the port housing and the lens. As with the other operations of the lens pressing system, operation and control of the position encoders and force feedback system is controlled in one embodiment by the computer 500 or other suitable controller that is operably connected to the lens pressing system. Of course, various other types of position and force feedback systems can be employed in other embodiments of the present invention.

During the pressing operation, the force feedback system can detect the amount of pressing force being used to press the ball lens 252 into the lens mount 310, according to the present position of the pressing tools 220 and 222 as detected by the position encoders. In one embodiment, between 20 and 50 pounds of force are used to suitably press fit the lens and lens mount to the proper position. Should the force feedback system detect during pressing a spike in the amount of force applied by the system, this can indicate that the ball lens 252 is about to crack under the pressing strain. The system can then immediately alert the operator to the existence of a potential problem condition existing with regard to the parts being pressed or a malfunction with the pressing system itself. In contrast, a reduction in measured force can indicate that the lens is too loose within the lens mount. Corrective action can then be taken. Thus, use of the force feedback system, together with the position encoder, helps to accurately position the lens within the port while reducing or obviating the need for inspection of the lens and lens mount after pressing is complete.

Use of the present lens pressing system can result in substantially higher throughput rates for lens insertion. In one embodiment, the lens insertion process can take less than two seconds per piece, which represents a rate up to four times faster than typical manual processes.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A bidirectional lens pressing system for use in pressing a lens into a lens retaining component, the lens pressing system comprising:
   a frame supporting a top motor stage, a bottom motor stage, and an indexing stage that retains the lens retaining component, the indexing stage being interposed between the top and bottom motor stages;
   a top pressing tool being selectively movable in a first direction by the top motor stage, the top pressing tool including a first engagement surface for engaging the lens; and
   a bottom pressing tool being selectively movable in a second direction by the bottom motor stage, the bottom pressing tool including a second engagement surface for engaging the lens retaining component, wherein the first and second engagement surfaces of the top and bottom pressing tools cooperate to press the lens into the lens retaining component while imposing no net force on the indexing stage.

2. The bidirectional lens pressing system as defined in claim 1, wherein the lens and the lens retaining component are disposed in a hole defined in the indexing stage.

3. The bidirectional lens pressing system as defined in claim 2, wherein the first and the second engagement surfaces are aligned with one another and can be selectively aligned with the hole in the indexing stage in which the lens and the lens retaining component are retained.

4. The bidirectional lens pressing system as defined in claim 3, wherein the first and second directions in which the top and bottom pressing tools are selectively movable are parallel to one another.

5. The bidirectional lens pressing system as defined in claim 4, wherein the first and second directions in which the top and bottom pressing tools are selectively movable are opposite one another.

6. The bidirectional lens pressing system as defined in claim 1, wherein the top and bottom pressing tools are selectively movable via respective top and bottom ball screw assemblies.

7. The bidirectional lens pressing system as defined in claim 1, wherein the lens retaining component is port housing having a lens mount, the lens mount retaining the lens after pressing.

8. The bidirectional lens pressing system as defined in claim 7, wherein the lens mount retains the lens in an interference fit.

9. The bidirectional lens pressing system as defined in claim 7, wherein the lens mount is integrally formed with the port housing.

10. The bidirectional lens pressing system as defined in claim 1, wherein the lens is a ball lens.

11. A lens pressing system, comprising:
an indexer stage having at least one hole for retaining a port housing;
a top motor stage;
a top pressing tool that is movable by the top motor stage in a first direction with respect to the indexer stage, the top pressing tool including a first engagement surface for engaging a lens;
a bottom motor stage;
a bottom pressing tool that is movable by the bottom motor stage in a second direction with respect to the indexer stage, the bottom pressing tool being aligned with the top pressing tool, the bottom pressing tool including a second engagement surface for engaging a surface of the port housing, wherein the bottom and top pressing tools are configured to exert opposing forces so as to press the lens into the port housing; and
a separator device included with the top pressing tool that is configured to separate the port housing from the top pressing tool after the lens is pressed into the port housing.

12. The lens pressing system as defined in claim 11, wherein the separator device is a housing that receives a portion of a post of the top pressing tool, the post including the first engagement surface.

13. The lens pressing system as defined in claim 12, wherein the separator housing is slidingly engaged with the post of the top pressing tool, and wherein a spring is included to urge the separator housing in a predetermined manner.

14. The lens pressing system as defined in claim 13, wherein the top and bottom pressing tools are aligned along an axis and are both movable along the first and second directions, the first and second directions being parallel to the axis.

15. The lens pressing system as defined in claim 14, wherein the first engagement surface is an annular tapered surface for engaging a ball lens.

16. The lens pressing system as defined in claim 15, wherein the indexer stage includes a plurality of holes, at least some of the holes including a port housing, and wherein the indexer is selectively movable so as to align a predetermined hole with the top and bottom pressing tools.

17. The lens pressing system as defined in claim 16, wherein the port housing is included in one of an optical transmitter and an optical receiver.

18. The lens pressing system as defined in claim 17, wherein the port housing is included in an optical subassembly of an optical transceiver module.

* * * * *